(12) United States Patent
Stratmoen et al.

(10) Patent No.: US 7,002,472 B2
(45) Date of Patent: Feb. 21, 2006

(54) SMART AND SECURE CONTAINER

(75) Inventors: Scott Alan Stratmoen, Arlington Heights, IL (US); Gary M. Urbanski, Rolling Meadows, IL (US); Thomas G. Moore, Mt. Prospect, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 135 days.

(21) Appl. No.: 10/412,074

(22) Filed: Apr. 11, 2003

(65) Prior Publication Data

US 2004/0041706 A1   Mar. 4, 2004

Related U.S. Application Data

(60) Provisional application No. 60/408,107, filed on Sep. 4, 2002.

(51) Int. Cl.
*G08B 1/08* (2006.01)

(52) U.S. Cl. .............. 340/539.26; 340/539.1; 340/539.13; 340/539.22; 340/568.1; 340/568.6; 340/573.1

(58) Field of Classification Search .......... 340/539.26, 340/539.1, 539.22, 568.1, 571.3, 438, 825.49, 340/573.1, 539.13, 568.6
See application file for complete search history.

(56) References Cited

U.S. PATENT DOCUMENTS

| | | | |
|---|---|---|---|
| 5,008,661 A | 4/1991 | Raj | |
| 5,053,748 A | 10/1991 | Stern | |
| 5,189,396 A | 2/1993 | Stobbe | |
| 5,448,220 A | 9/1995 | Levy | |
| 5,515,030 A * | 5/1996 | Citron et al. ............ | 340/545.2 |
| 5,565,858 A | 10/1996 | Guthrie | |
| 5,574,360 A | 11/1996 | Richardson | |
| 5,615,247 A * | 3/1997 | Mills ....................... | 455/411 |
| 5,629,981 A | 5/1997 | Nerlikar | |
| 5,646,592 A | 7/1997 | Tuttle | |
| 5,649,295 A | 7/1997 | Shober et al. | |
| 5,649,296 A | 7/1997 | MacLellan et al. | |
| 5,686,888 A * | 11/1997 | Welles et al. .......... | 340/539.13 |
| 5,705,818 A | 1/1998 | Kelbel et al. | |
| 5,742,618 A | 4/1998 | Lowe | |
| 5,744,791 A | 4/1998 | Isaac et al. | |
| 5,745,037 A | 4/1998 | Guthrie et al. | |

(Continued)

OTHER PUBLICATIONS

HI-G-TIK website re: Hi-G-DataSeal.

(Continued)

*Primary Examiner*—Thomas J. Mullen, Jr.
*Assistant Examiner*—Tai T. Nguyen
(74) *Attorney, Agent, or Firm*—Stetina, Brunda, Garred & Brucker (57) ABSTRACT

A smart container configured for transporting cargo on a transportation vehicle and a method for transporting the smart container on the transportation vehicle are disclosed. The smart container includes a container housing that has an opening for loading and unloading cargo. The opening can be sealed and unsealed. Disposed within the container housing is at least one detector for detecting deviations that could be indicative of possible threats (security concerns). A communications link is also disposed within the container housing. The communications link is capable of transmitting the possible threat information to a central cargo data collection location. For example, the container(s) on a transportation vehicle (e.g., a ship) transport information about the container to a central data collector onboard the ship. The central data collector may then transmit that information off of the ship, e.g., to a C4ISR grid.

41 Claims, 4 Drawing Sheets

U.S. PATENT DOCUMENTS

| | | | |
|---|---|---|---|
| 5,801,643 A | 9/1998 | Williams et al. | |
| 5,822,714 A | 10/1998 | Cato | |
| 5,831,519 A | 11/1998 | Pedersen et al. | |
| 5,831,531 A | 11/1998 | Tuttle | |
| 5,844,942 A | 12/1998 | Hicks et al. | |
| 5,864,580 A | 1/1999 | Lowe et al. | |
| 5,872,455 A | 2/1999 | Pohribnij et al. | |
| 5,910,956 A | 6/1999 | Guthrie et al. | |
| 5,929,779 A | 7/1999 | MacLellan et al. | |
| 5,948,103 A | 9/1999 | Fukuzaki | |
| 5,995,048 A | 11/1999 | Smithgall et al. | |
| 5,999,091 A | 12/1999 | Wortham | |
| 6,027,027 A | 2/2000 | Smithgall | |
| 6,028,626 A | 2/2000 | Aviv | |
| 6,035,260 A | 3/2000 | Pohribnij et al. | |
| 6,049,278 A | 4/2000 | Guthrie et al. | |
| 6,058,374 A | 5/2000 | Guthrie et al. | |
| 6,069,563 A | 5/2000 | Kadner et al. | |
| 6,097,301 A | 8/2000 | Tuttle | |
| 6,101,477 A | 8/2000 | Hohle et al. | |
| 6,107,920 A | 8/2000 | Eberhardt et al. | |
| 6,118,379 A | 9/2000 | Kodukula et al. | |
| 6,130,623 A | 10/2000 | MacLellan et al. | |
| 6,147,606 A | 11/2000 | Duan | |
| 6,148,291 A | 11/2000 | Radican | |
| 6,166,638 A | 12/2000 | Brady et al. | |
| 6,177,872 B1 | 1/2001 | Kodukula et al. | |
| 6,184,841 B1 | 2/2001 | Shober et al. | |
| 6,243,005 B1 | 6/2001 | Haimovich et al. | |
| 6,246,882 B1 | 6/2001 | Lachance | |
| 6,265,973 B1 | 7/2001 | Brammall et al. | |
| 6,281,793 B1 | 8/2001 | Haimovich et al. | |
| 6,281,794 B1 | 8/2001 | Duan et al. | |
| 6,281,797 B1 * | 8/2001 | Forster et al. | 340/572.3 |
| 6,286,762 B1 | 9/2001 | Reynolds et al. | |
| 6,297,734 B1 | 10/2001 | Richardson et al. | |
| 6,320,509 B1 | 11/2001 | Brady et al. | |
| 6,329,944 B1 | 12/2001 | Richardson et al. | |
| 6,335,685 B1 | 1/2002 | Schrott et al. | |
| 6,339,397 B1 | 1/2002 | Baker | |
| 6,340,932 B1 | 1/2002 | Rodgers et al. | |
| 6,366,260 B1 | 4/2002 | Carrender | |
| 6,375,038 B1 | 4/2002 | Daansen et al. | |
| 6,381,416 B1 | 4/2002 | Manico et al. | |
| 6,393,045 B1 | 5/2002 | Belcher et al. | |
| 6,401,078 B1 | 6/2002 | Roberts et al. | |
| 6,407,666 B1 | 6/2002 | Debrody et al. | |
| 6,420,971 B1 | 7/2002 | Leck et al. | |
| 6,456,239 B1 | 9/2002 | Werb et al. | |
| 6,456,668 B1 | 9/2002 | MacLellan et al. | |
| 6,469,627 B1 | 10/2002 | Forster et al. | |
| 6,483,434 B1 | 11/2002 | UmiKer | |
| 6,483,473 B1 | 11/2002 | King et al. | |
| 6,496,806 B1 | 12/2002 | Horwitz et al. | |
| 6,501,435 B1 | 12/2002 | King et al. | |
| 6,512,478 B1 | 1/2003 | Chien | |
| 6,628,237 B1 | 9/2003 | Forster et al. | |
| 6,658,394 B1 | 12/2003 | Khaishgi et al. | |
| 6,725,158 B1 | 4/2004 | Sullivan et al. | |
| 2002/0017977 A1 | 2/2002 | Wall | |
| 2002/0070891 A1 | 6/2002 | Huston | |
| 2003/0139909 A1 | 7/2003 | Ozawa | |
| 2003/0179073 A1 | 9/2003 | Ghazarian | |
| 2003/0189491 A1 | 10/2003 | Ng | |
| 2003/0193433 A1 | 10/2003 | Carson | |
| 2004/0041705 A1 * | 3/2004 | Auerbach et al. | 340/539.22 |
| 2004/0066328 A1 | 4/2004 | Galley, III et al. | |
| 2004/0233054 A1 * | 11/2004 | Neff et al. | 340/539.1 |
| 2004/0263329 A1 | 12/2004 | Cargonja et al. | |
| 2005/0046567 A1 | 3/2005 | Mortenson et al. | |

OTHER PUBLICATIONS

AMSKAN website re: Intelligent Transport Systems.
RFID Journal, Inc., www.rfidjournal.com/article/articleprint/655/-1/1 Building a Smarter Container, RFID Journal, 2 pages (Nov. 19, 2003).
Machalaba et al., NAVITAG Technologies, Inc., www.navitag.com/news/news-07.htm, Thinking Inside the Box: Shipping Containers Get 'Smart', 2 pages, (Jan. 15, 2004).
Maritime Smart Containers Market Report 2004-2012 Homeland Security Research Corporation and North River Consulting Group.

* cited by examiner

SMART AND SECURE CONTAINER

CROSS-REFERENCE TO RELATED APPLICATIONS

This application claims the benefit of U.S. Provisional Application 60/408,107, filed Sep. 4, 2002, the entire contents of which are hereby incorporated by reference.

STATEMENT RE: FEDERALLY SPONSORED RESEARCH/DEVELOPMENT (Not Applicable)

BACKGROUND OF THE INVENTION

The present invention relates generally to containers and more particularly to a smart and secure container.

Elements (e.g., containers, vessels, people) in international cargo transit (via air, sea or land) all host a potential threat. Examples of such threats include, but are not limited to: diverting a container from its planned route and exchanging cargo including weapons of mass destruction (WMD) with a portion of the original content; sealing cargo containers that include WMD in the container; and the transport of one or more terrorists inside the container. It is highly desirable to minimize the risk of threat. It is also desirable to minimize potential threats by keeping elements that have a high probability of threat outside the intended target area/environment.

In February of 2002, Robert C. Bonner, the Commissioner of Customs stated that "[t]he Container Security Initiative consists of four core elements. These are: (1) establishing security criteria to identify high-risk containers; (2) pre-screening containers before they arrive at U.S. ports; (3) using technology to pre-screen high-risk containers; and (4) developing and using smart and secure containers."

The development and use of smart and secure containers should employ technologies that eliminate the highest percent possible of the non-threatening cargo transit elements in order for the physical security interdiction and verification to take place on the real threat(s). The interdiction should take place at the farthest possible point from the intended target. In addition to the threats described above, additional concerns include the loading of non-smart containers onto a vehicle (e.g., ship); a non-smart container with WMD cargo being loaded onto the ship en route to the destination; and one or more smart containers being disabled or damaged en route.

Current containers include an electronic seal and global positioning system (GPS) location logging. The electronic seal not only provides a tamper detection function but can also be used to carry data related to the container (e.g., manifest). The GPS logging function permits detecting a deviation from the planned transit route at the destination point. Such a system utilizing only standalone electronic seals and GPS logging does not provide adequate security against a high-risk container (e.g., one in which the seal has been violated in transit or in which a suspicious route deviation has occurred). Such a system cannot identify a high-risk container while still en route (e.g., on the open ocean or in flight). In addition, such a system places an implicit trust in the individual(s) activating the electronic seal.

Thus, there is a need for a system that can detect and minimize the risk of high-risk containers. Such minimization of the risk includes detection of high-risk containers sufficiently early so that the container can be diverted from the intended target area.

BRIEF SUMMARY OF THE INVENTION

A smart container configured for transporting cargo on a transportation vehicle and a method for transporting the smart container on the transportation vehicle are disclosed. The smart container includes a container housing that has an opening for loading and unloading cargo. The opening can be sealed and unsealed. Disposed within the container housing is at least one detector for detecting deviations that could be indicative of possible threats (security concerns). A communications link is also disposed within the container housing. The communications link is capable of transmitting the possible threat information to a central cargo data collection location. For example, the container(s) on a transportation vehicle (e.g., a ship) transport information about the container to a central data collector onboard the ship. The central data collector may then transmit that information off of the ship, e.g., to a C4ISR grid.

The container may also include a logging device. The logging device stores information about the container.

The container may also include or be in communication with a global positioning system. The logging device may receive and store location information from the global positioning system. Such location information could be stored at periodic intervals. The periodic intervals could vary based on the location of the transportation vehicle as determined by the global positioning system. For example, such logging may occur more often in certain high-risk geographic areas. Such reporting could also occur more frequently as the transportation vehicle approached the destination. Another example of when the reporting frequency could increase is when potential threats have been identified.

The communications link may transmit information to the central cargo data collection location via at least one other smart container. Thus, the containers are configured in a chain-type fashion wherein information is forwarded through various containers and a final container in the chain transmits the information to the central cargo data collection location.

The container housing may be a conventional container housing that is retrofitted to have the at least one cargo contents detector and the communications link disposed within the conventional housing. The conventional container housing may include: a global positioning system location logging device disposed within the conventional container housing; and a commercial electronic seal configured to seal and unseal the container opening.

The commercial electronic seal may include a radio frequency identification tag and/or a tamper resistant member.

The detector may be a cargo contents detector, a container security detector, a route deviation detector or some combination thereof.

The contents cargo detector may be a container volumetric change detector, a WMD detector, a motion detector, or some combination thereof.

The volumetric change detector is configured to detect a deviation from a known volume of the cargo. This may be done using cargo profiling and/or reverberation measurements. The WMD detector is configured to detect materials comprising radioactive isotopes stored in the container. Such isotopes may be indicative of nuclear/radiological weapons, biological weapons and/or chemical/explosive weapons.

The motion detector is configured to detect cargo movement within the smart container.

The container security detector may be a breach detector, a door open/close detector or some combination thereof.

The breach detector is configured to detect unauthorized container entry, such as cutting of the container and/or container shell openings.

The door open/close detector is configured to detect container entry via the container opening.

The route deviation detector compares the current location of the transportation vehicle to the planned route to determine if there has been a significant deviation from the planned route. The current location information may be obtained from a global positioning system.

The method of transporting cargo in the container (such as the one described above) via a transportation vehicle to a destination point includes: (a) loading the cargo in a container that includes at least one container security detector for monitoring container security; (b) electronically sealing the container; (c) loading the container on the transportation vehicle; (d) transporting the cargo via the transportation vehicle; and (e) continuously monitoring container security during transit using the at least one container security detector.

The method may also include: (f) evaluating container security risk based on data collected while monitoring container security; (g) if the container security risk is high, taking corrective action; and (h) if the container security risk is not high: (i) proceeding to the destination point; and (ii) electronically unsealing the smart container. The corrective action taken when the container security risk is high may be not to proceed to the destination point.

BRIEF DESCRIPTION OF THE DRAWINGS

These as well as other features of the present invention will become more apparent upon reference to the drawings wherein.

DETAILED DESCRIPTION OF THE INVENTION

Figure 1:
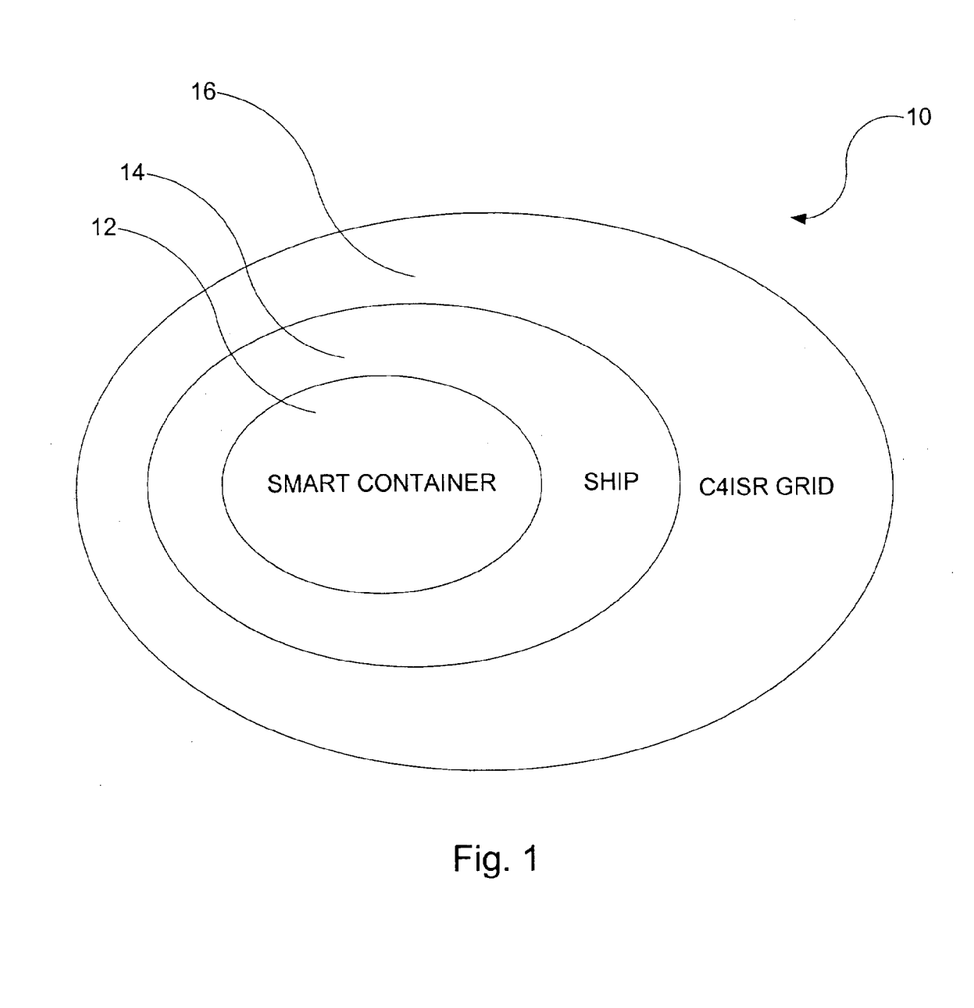
FIG. 1 illustrates a hierarchical network of unmanned/unattended autonomous sensors that are in part embodied as smart and secure containers.

Referring now to the drawings wherein the showings are for purposes of illustrating preferred embodiments of the present invention only, and not for purposes of limiting the same, FIG. 1 illustrates a hierarchical network 10 of unmanned/unattended autonomous sensors that are in part embodied as smart and secure containers 12. Collectively, the network 10 facilitates the risk analysis/response cycle with a timeline appropriate to interdicting the threat at a distance that protects the homeland.

The system 10 interrogates the vehicle's (e.g., ship's) contents and verifies shipping information. Automatic verification of shipping information against the manifest reduces the need for inspections, which reduces costs. The system includes a central station that has access to master cargo lists, ships' travel history and links to Intel/law enforcement databases. This allows the system 10 to covertly collect data that may be provided to law enforcement agencies.

As shown in FIG. 1, the Command, Control, Communications, Computers, Intelligence, Surveillance, and Reconnaissance (C4ISR) grid 16 includes one or more ships 14. Each ship 14 includes one or more smart containers 12. Collectively the sensor network 10 facilitates the risk analysis/decision/response cycle with a timeline appropriate to interdicting the threat at a distance that protects the homeland.

Figure 3:
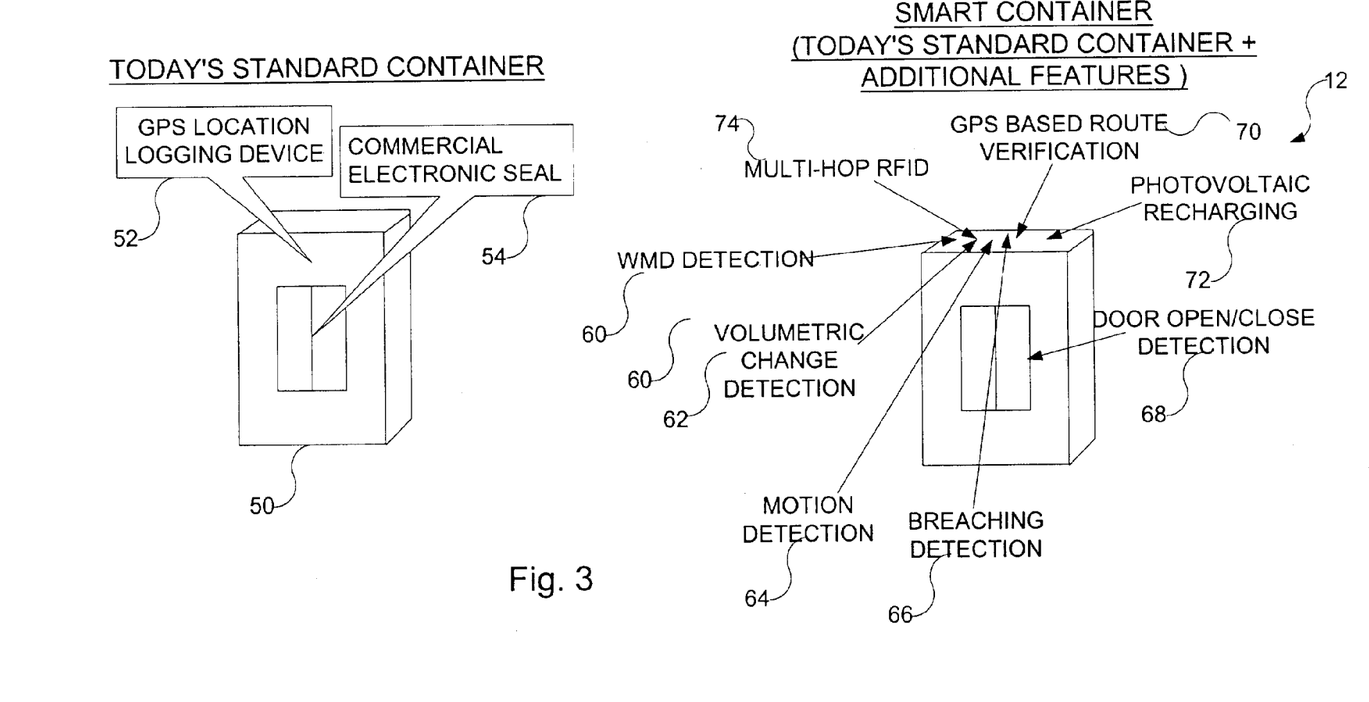
FIG. 3 illustrates a smart and secure container created by retrofitting an existing container.

In exemplary embodiments, the smart container 12 is created by retrofitting an existing container 50 as shown in FIG. 3. Preferably, the existing container 50 that is retrofitted includes a GPS location logging device 52 and a commercial electronic seal 54. In exemplary embodiments, the commercial electronic seal includes a radio frequency identification (RFID) tag, tamper detection of the electronic seal and a record of manifest. The record of manifest includes a description of the container contents (e.g., type of materials stowed in the container, weight of contents and/or volume of contents. The record of manifest may also include the destination and planned route for the container.

The off-the-shelf container 50 is a retrofitted with a self-contained package that consists of a set of sensors to detect Weapons of Mass Destruction (WMD) threats 60, breaching 66, gross alternation of contents 62, deviation from planned routes 70, as well as a means of localized communications 74. Smart containers 12 exchange information not only each other but with the sensors on board the vehicle (e.g., ship) 14 and indirectly (via the ship 14) a global C4ISR grid 16. Each of the smart containers 12 includes nuclear, biological and chemical (NBC) sensors 60. The containers 12 also include sensors for detecting volumetric changes 62, weight changes, motion 64, breach 66, and route deviation 70. The containers also include container communication links 74 for communicating with other containers 12 and with the vehicle (e.g., ship) 14 on which the container 12 is located.

Current containers 50 include a GPS location logging device 52 and a commercial electronic seal 54. Current electronic seals provide the following functions: Radio Frequency Identification (RFID), tamper detection and record of manifest. Current electronic seals function like a padlock. The existing container 50 can be retrofitted to include various detectors. Motion and/or light detectors can be used to warn of any attempt to penetrate the container by bypassing the seal. The containers can also be retrofitted to include door open/close detection 68 and breaching detection 66. Furthermore, a volumetric change detector 62 and/or weight change detector can be added to the container. A nuclear, biological and chemical (NBC) detector 60 can be added to the container. In addition to various detectors, the container may include GPS based route verification 70. The route verification compares the current location information to the planned route information. The planned route information may be stored, for example, in the record of manifest.

Volumetric change detectors 62 may include cargo profiling and/or reverberation measurements. Cargo profiling is similar to motion detection. A sensor is mounted in the ceiling of the container 12. The detector map profiles the top of the cargo and can detect changes from the mapped profile of the top of the cargo. The cargo profiling can also detect changes in mass via strain sensors in the frame of the container. Multiple sensors may be used to measure profile across horizontal planes. Reverberation measurements adapt methods from architectural acoustics to characterize reverberation in container volume. Periodic measurements are taken and compared in order to detect changes in volume and/or weight.

Breaching detection 66 includes detection of cutting and/or openings in the container shell. Detection of cutting is accomplished via passive vibration. Accelerometers are mounted to the container shell. Data is sent to a low-power monitoring system. A vibration event triggers the system to wake up and evaluate the vibration. Strain sensors may be mounted on the container frame to detect changes in structure. Openings in the container shell are detected via active vibration, for example via ultrasound. Shakers/accelerometers are mounted to container shell test transmission paths through the shell (similar to current non-destructive test procedures) or different resonances of paths. A new opening in the container shell alters transmission paths.

WMD may include, but are not limited to, nuclear, biological and chemical weapons, including "dirty bombs". The detectors of WMD 60 may include nuclear/radiological detectors, biological detectors, chemical explosive detectors, or any combination thereof. The nuclear detectors will preferably detect the most common fissionable materials (Plutonium-239 and Uranium-235). Other current and future detectors of nuclear radiological materials may be used. Chemical/explosive detectors may include ion mobility and surface acoustic wave sensors. Gas chromatograph/mass spectrometers may also be used.

Various events may be logged. Such logging should include a date and time stamp. Examples of such loggable events include: GPS location logging, seal/unseal events, container volumetric signatures and tamper detection events. GPS location logging should occur whenever the container is sealed or unsealed and periodically during transit. The seal/unseal logging should include a biometric identification of the individual sealing or unsealing the container. Container volumetric signatures should be logged whenever the container is sealed or unsealed and periodically during transit.

Ships (or other vehicles) 14 are retrofitted with ship level sensors capable of detecting WMD threats contained within the structure of the ship (e.g., superstructure, hull, etc.), as well as container communications and global C4 communications links. The shipboard systems not only facilitate transport of information from the containers to the global C4 grid, but also manage the risk of threats that are not contained within containers. The ship (or other vehicle) includes ship level sensors for detecting nuclear, biological and chemical weapons. The ship also includes communications links for communicating with the C4ISR grid and communications links for communicating with smart containers on board the ship.

Figure 2:
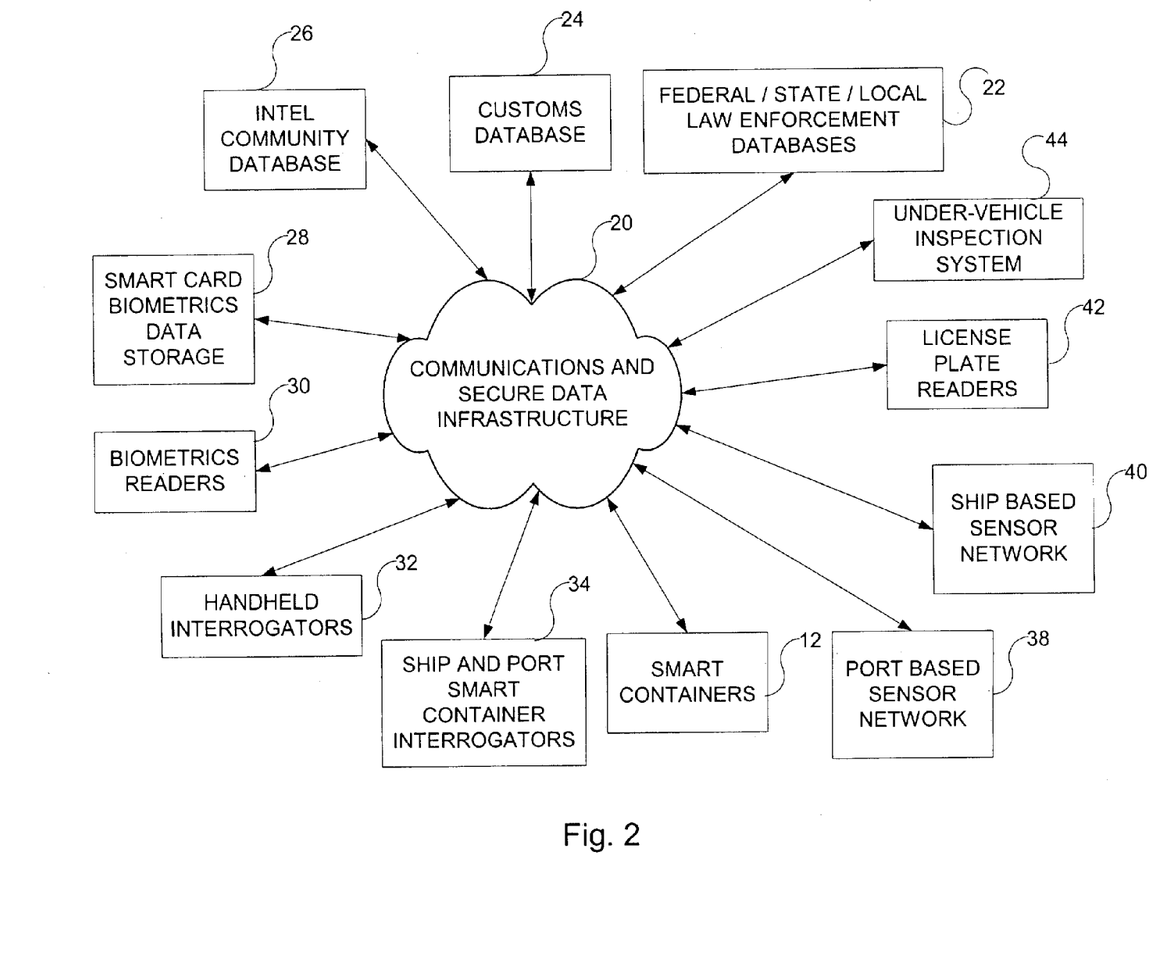
FIG. 2 illustrates exemplary subsystems of a communications and secure data infrastructure.

As shown in FIG. 2, the C4ISR grid 16 fuses information from ships 14 and smart/secure containers 12, with federal/state/local databases and implements the risk analysis decision/response cycle. The C4ISR grid includes a global C4 communications link. It is capable of Federal/State/Local database fusion. It performs law enforcement, customs and intelligence (Intel) functions. The C4ISR also performs analysis/decision/response cycles. In order to perform these functions, the C4ISR grid implements a communications and secure data infrastructure 20. This includes law enforcement database(s) 22, customs database(s) 24, Intel community database(s) 26, and smart and biometrics data storage 28. The communications and secure data infrastructure 20 includes smart containers 12 as well as a ship based sensor network (described above) 40 and a port based sensor network. The communications and secure data infrastructure 20 may also include an under-vehicle inspection system 44, license plate readers 42, ship and port smart card interrogators 34, handheld interrogators 32, and biometrics readers 30.

Figure 4:
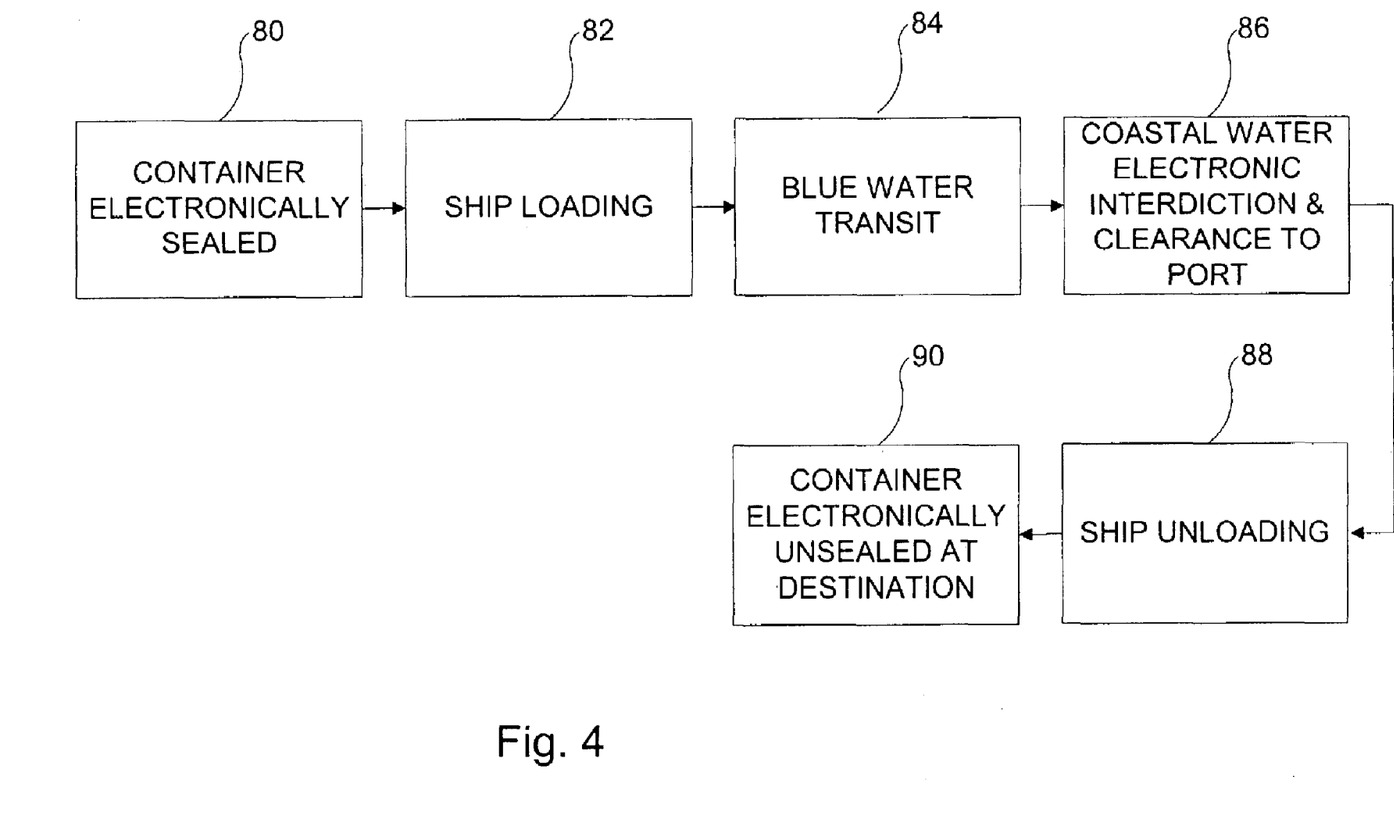
FIG. 4 illustrates an exemplary system of operations for a smart container that is loaded on a ship.

FIG. 4 illustrates an exemplary system of operations for a smart container 12 that is loaded on a ship 14. At a Customs-Trade Partnership Against Terrorism (C-TPAT) member shipper location cargo is loaded into a smart and secure container. Subsequently an individual authorized by the shipper utilizes a handheld interrogator to electronically seal the container 80. A biometric signature reader 30 with smart card storage medium, integral to the handheld interrogator, is utilized to verify the identity of the authorized individual. As part of the sealing action, the event is logged into container memory along with the authorizing biometric signature and manifest.

Subsequently a port crane lifts the container onto a container ship 82. To ensure that containers that do not utilize smart/secure container technology are either not loaded onto the ship or that their existence is documented, the port crane utilizes an interrogator. The port crane interrogator queries the container (e.g., the RFID tag) during the lifting process. The lading is updated, the route, weight and center of gravity (CG) are loaded. In exemplary embodiments, during a transitional period of phasing out non-compliant existing containers 50 in favor of smart and secure containers 12, the existence of non-compliant containers 12 are logged in ship memory via communication between the port crane interrogator and shipboard interrogator. When smart and secure containers 12 are universally deployed, non-compliant or non-functional containers 50 will be rejected and subsequently not loaded onto the ship 14.

During blue water transit 84, smart containers 12 communicate with each other and with the shipboard interrogator periodically generating an aggregate risk assessment. Risk assessments are generated from container and shipboard sensors, as well as potential deviations from planned routing. Given that arbitrary containers have no line-of-sight to the sky and GPS satellite resources, ship location information is related to containers via a store-and-forward ad-hoc network of intra-container communication links.

When the ship crosses the 200-mile homeland boundary an electronic interdiction and potential clearance to proceed to port occurs 86. Risk assessment, manifest and lading records are communicated to either a homeland based fusion center via satellite communications or to interdicting vehicles (air or sea) via the intra-container communication link. The information provided by the ship/container network is utilized to feed the analysis/decision/response cycle. Assuming that a low risk assessment is generated (e.g., ship did not divert to a high risk port, containers remained sealed, WMD sensors did not detect a threat, etc.) the ship 14 is given a clearance to proceed to port. Alternatively, if a threat has been identified, it has been identified at a range from the homeland sufficient for protection as well as within a timeline applicable for physical interdiction.

At the port of entry the container is unloaded 88 and via the port crane interrogator the lading record is updated, manifest read and risk assessment reconfirmed.

At the container's destination a handheld interrogator is utilized to electronically unseal the container 90 and, update the record of lading. Continuity in the end-to-end chain-of-custody establishes security assurance as well as underpins insurance industry indemnification.

The smart containers 12 described herein can be used to detect and identify WMD using NBC detectors. An example of one such detector is a cadmium zinc telluride gamma ray detector. However, it will be appreciated that other WMD detectors may be used instead of or in addition to NBC detectors. Such detectors may be presently existing detectors or may be detectors created in the future.

The smart containers 12 can be used to establish and verify end-to-end chain of custody. The containers 12 include integral door secured sensors and integral acoustic volumetric charge sensors. The GPS devices can be used to determine deviations from the planned route. The containers 12 are capable of stand-alone interrogation as well as interrogation when in stack (i.e., in communication with other containers and with the ship 14). Intra-container communications and the container/ship communications are accomplished via a wireless radio frequency (RF) link. Preferably, stored data is encrypted.

The containers 12 should be constructed to withstand a worldwide environment. They should minimize damage to/from cargo. Furthermore, externals should minimize damage to/from the containers and handling equipment, for example by placing externals, such as antenna, photovoltaic, etc. within the steel corrugations of the container.

The containers 12 should also have a minimal impact on economic commerce. One way in which this is achieved is by retrofitting existing containers. Other factors in minimizing economic impact include design and manufacturing which reduce safety hazards associated with the container system as well as design and construction so that the mean time between failures (MTBF) is in the magnitude of years.

The capabilities described above are implemented in smart containers 12, fixed interrogators 34, handheld interrogators 32 and a multi-hop RF network. In order to maintain container integrity, smart container 12 includes various features as described next. The containers include container subsystems for tamper detection, door open/close detection, gross content tamper detection and motion detection, for example, an ultrasound motion detector. The containers also include an accelerometer for detecting cutting, welding or opening of the container. The container also includes a volumetric change detection active acoustic reverberation signature as well as cargo height profiling ultrasound. The containers 12 also include route verification, GPS with a stored planned route.

The containers also include a container power source such as a container battery 72. Various batteries may be used, such as lithium batteries. The container should also have a rechargeable power source 72 such as a photovoltaic cell.

The smart container 12 also includes an intra-container and container/interrogator link with the multi-hop RF network 74. In exemplary embodiments the multi-hop RF network 74 uses an ad hoc network protocol. The multi-hop RF network 74 also includes a symmetric RF link. Containers 12 may communicate directly with a central logging location on the ship 14 or a container 12 may send information to another container 12. The containers 12 continue to forward the information until a final container 12 forwards the information to the central logging location on the ship 14. Any type of wireless technology currently available or available in the future that has suitable range may be used for implementing the communication links. The containers 12 send messages indicating the state of the container and the cargo stored within the container. For example, periodic status messages may be sent. Such messages include a container identification and time. The message may include additional information such as any changes from the previous message. Such changes may include volumetric changes, weight changes, new location information, breaching information, material changes (e.g., change in the composition of the container contents), etc. The messages may be sent at periodic intervals, e.g., every 5 minutes. The time intervals may vary based on the location of the transportation vehicle. For example, messages may be sent more often in specific geographic locations and/or as the transportation vehicle gets closer to the destination.

Fixed interrogators 34 include a fixed infrastructure link Ethernet connectivity. They may also include an optional wireless infrastructure (WLAN). The fixed interrogator may also include an optional global link SATCOM. An optional overhead link radar responsive tag may also be implemented. The fixed interrogator interrogates container status for the multi-hop RF network.

Handheld interrogators 32 are used to obtain identification of operator smart card readers. They have local infrastructure connectivity (WLAN). They are used to seal/unseal the communication link multi-hop RF network. The handheld interrogators 32 also provide physical verification of operator biometric signature readers 30.

Additional modifications and improvements of the present invention may also be apparent to those of ordinary skill in the art. Thus, the particular combination of parts described and illustrated herein is intended to represent only a certain embodiment of the present invention, and is not intended to serve as a limitation of alternative devices within the spirit and scope of the invention.

What is claimed is:

1. A method of transporting cargo in a container via a transportation vehicle to a destination point, the method comprising:
   (a) loading the cargo in the container, the container including at least one container security detector for monitoring container security;
   (b) electronically sealing the container;
   (c) loading the container on the transportation vehicle;
   (d) transporting the cargo via the transportation vehicle;
   (e) continuously monitoring container security during transit using the at least one container security detector;
   (f) evaluating container security risk based on data collected while monitoring container security;
   (g) if the container security risk is high, taking corrective action; and
   (h) if the container security risk is not high:
      (i) proceeding to the destination point; and
      (ii) electronically unsealing the smart container.

2. The method of claim 1, wherein the corrective action taken when the container security risk is high comprises not proceeding to the destination point.

3. The method of claim 1, wherein evaluating container security risk comprises determining if there was a volumetric change in container contents.

4. The method of claim 1, wherein evaluating container security risk comprises determining if there was breach of the container.

5. The method of claim 1, wherein evaluating container security risk comprises determining if the container contains a material having a radioactive isotope.

6. The method of claim 1, wherein evaluating container security risk comprises determining if there was a route deviation.

7. The method of claim 1, further comprising logging container events.

8. The method of claim 1, further comprising communicating with at least one other smart container.

9. The method of claim 1, further comprising communicating with the transportation vehicle via a central communications link.

10. A smart and secure container for storing cargo having an opening capable of being sealed and unsealed, the smart container comprising:
   a container security system for detecting deviations from secure conditions within the container;
   a power source; and
   at least one wireless communications device for communicating information representative of detected deviations to a monitoring station;
   wherein the container security system includes:
      a door open/close detection device;
      a GPS based route verification feature;
      a intrusion detection device;
      a motion detection device;
      a volumetric change detection device; and
      a weapons of mass destruction (WMD) detection feature.

11. The smart container according to claim 10, further including a logging device for storing information from the container security system.

12. The smart container according to claim 10, wherein the weapons of mass destruction (WMD) detection feature includes,
   a nuclear material sensing feature;
   a biological material sensing feature; and
   a chemical sensing feature.

13. The smart device according to claim 10, wherein the volumetric change detection device includes a cargo profiling feature including,
   a sensor mounted inside the container housing which maps a profile of the cargo and detects changes from the mapped profile; and
   a plurality of mass strain sensors on the container housing which detect changes in the container housing.

14. The smart device according to claim 10, wherein the volumetric change detection feature includes a reverberation measuring device which takes periodic architectural acoustical measurements characterizing reverberation in the container housing to detect changes in at least one of volume and weight.

15. The smart device according to claim 10, wherein the intrusion detection device includes,
   a plurality of accelerometers mounted to the container housing which detect at least one of cutting and opening the container housing via passive vibration; and
   a plurality of strain sensors mounted to the container which detect changes in the container housing structure.

16. The smart device according to claim 10, wherein the GPS based route verification feature compares current location information to planned route information.

17. The smart device according to claim 10, wherein the power source includes,
   container battery; and
   rechargeable power source.

18. The smart device according to claim 17, wherein the rechargeable power source is a photovoltaic cell.

19. The smart device according to claim 10, wherein the at least one wireless communication device includes an intra-container and container/interrogator link adapted to communicate with a multi-hop RF network.

20. A smart and secure container for storing cargo having an opening capable of being sealed and unsealed, the smart container comprising:
   a container security system for detecting deviations from secure conditions within the container;
   a power source;
   at least one wireless communications device for communicating information representative of detected deviations to a monitoring station; and
   a logging device for storing information from the container security system;
   wherein the logging device stores a date and time of significant events, including,
   GPS location;
   door seal/unseal events;
   container volumetric signatures; and
   tamper detection events.

21. The smart container according to claim 20 wherein the container security system detects unauthorized opening of the container during transit of the container.

22. The smart container according to claim 20 wherein the container security system detects unauthorized opening of the container, other then opening of the container door during transit of the container.

23. The smart container according to claim 20, wherein GPS location logging occurs when the container is sealed/unsealed and periodically during transit.

24. The smart container according to claim 20, wherein the door seal/unseal events logging events include a biometric identification of an individual sealing/unsealing the container.

25. The smart container according to claim 20, wherein container volumetric signatures are logged whenever the container is sealed/unsealed and periodically during transit.

26. The smart container according to claim 20, further including an electronic seal device.

27. A smart and secure container for storing cargo having an opening capable of being sealed and unsealed, the smart container comprising:
   a container security system for detecting deviations from secure conditions within the container;
   a power source;
   at least one wireless communications device for communicating information representative of detected deviations to a monitoring station; and
   an electronic seal device, the electronic seal device including,
   a radio frequency identification (RFID) tag;
   a tamper detection feature; and
   a record of manifest feature including,
      a description of the container contents;
      a destination; and
      a planned route for the container.

28. The smart container according to claim 27, the description of the container contents including,
   type of materials stowed in the container;
   weight of contents; and
   volume of contents.

29. The smart container according to claim 27, wherein the container housing is a retrofitted container housing.

30. A communications and data information network for interdicting a hostile threat within a shipping container, the network comprising:
   at least one smart and secure container having a wireless communications link for receiving and transmitting security information representing security of contents within the container;
   a communications and data information network grid including at least one vehicle for transporting the at least one smart container, the at least one vehicle having a wireless communications link; and a central station having a wireless communications link in communication with the grid and the at least one smart container, the central station configured to interrogate the at least one smart container's contents and verify security information;

wherein the communications and data information network grid is connectable to intel community databases, customs databases, federal/state/local law enforcement databases, under-vehicle inspection systems, license plate readers, vehicle-based sensor networks, port-based sensor networks, the at least one smart container, vehicle and port smart container interrogators, hand-held interrogators, biometric readers, and smart card biometrics data storage.

31. A communications and data information network for interdicting a hostile threat within a shipping container, the network comprising:

at least one smart and secure container having a wireless communications link for receiving and transmitting security information representing security of contents within the container;

a communications and data information network grid including at least one vehicle for transporting the at least one smart container, the at least one vehicle having a wireless communications link;

a central station having a wireless communications link in communication with the grid and the at least one smart container, the central station configured to interrogate the at least one smart container's contents and verify security information; and at least one handheld interrogators to electronically seal and unseal the at least one smart container, and to update records of lading with respect to the container's contents.

32. A communications and data information network for interdicting a hostile threat within a shipping container, the network comprising:

at least one smart and secure container having a wireless communications link for receiving and transmitting security information representing security of contents within the container;

a communications and data information network grid including at least one vehicle for transporting the at least one smart container, the at least one vehicle having a wireless communications link; and a central station having a wireless communications link in communication with the grid and the at least one smart container, the central station configured to interrogate the at least one smart container's contents and verify security information;

wherein the network is a multi-hop RF network utilizing an ad hoc network protocol.

33. A communications and data information network for interdicting a hostile threat within a shipping container, the network comprising:

at least one smart and secure container having a wireless communications link for receiving and transmitting security information representing security of contents within the container;

a communications and data information network grid including at least one vehicle for transporting the at least one smart container, the at least one vehicle having a wireless communications link; and a central station having a wireless communications link in communication with the grid and the at least one smart container, the central station configured to interrogate the at least one smart container's contents and verify security information;

wherein the at least one smart container is adapted to communicate directly with and send information to another smart container, and communicate directly with and send information to a central logging location on the at least one vehicle.

34. A smart container configured to transport cargo on a transportation vehicle, the smart container comprising:

(a) a container housing having an opening capable of being sealed and unsealed;

(b) at least one container security detector disposed within the container housing, the at least one container security detector configured to detect deviations in the security of the container; and (c) a communications link disposed within the container housing and in communication with the at least one container security detector, the communications link configured to receive container security deviation information from the at least one container security detector and to transmit the container security deviation information from the container to a central cargo data collection location;

(d) wherein the at least one container security detector comprises a breach detector configured to detect unauthorized container entry; and (e) wherein the breach detector detects cutting of the container.

35. A smart container configured to transport cargo on a transportation vehicle, the smart container comprising:

(a) a container housing having an opening capable of being sealed and unsealed;

(b) at least one container security detector disposed within the container housing, the at least one container security detector configured to detect deviations in the security of the container; and (c) a communications link disposed within the container housing and in communication with the at least one container security detector, the communications link configured to receive container security deviation information from the at least. one container security detector and to transmit the container security deviation information from the container to a central cargo data collection location;

(d) wherein the at least one container security detector comprises a breach detector configured to detect unauthorized container entry; and (e) wherein the breach detector detects shell openings of the container.

36. A smart container configured to transport cargo on a transportation vehicle, the smart container comprising:

(a) a container housing having an opening capable of being sealed and unsealed;

(b) at least one cargo contents detector disposed within the container housing, the at least one cargo contents detector configured to detect deviations from known characteristics of the cargo; and (c) a communications link disposed within the container housing and in communication with the at least one cargo contents detector, the communications link configured to receive cargo characteristic deviation information representative of an intrusion into the container housing from the at least one cargo contents detector and to transmit the cargo characteristic deviation information from the container to a central cargo data collection location;

(d) wherein the at least one cargo contents detector comprises a container volumetric change detector, the container volumetric change detector configured to detect a deviation from a known volume of the cargo; and
(e) wherein the container security system includes:
a door open/close detection device;
a GPS based route verification feature;
a intrusion detection device;
a motion detection device;
a volumetric change detection device; and
a weapons of mass destruction (WMD) detection feature.

37. The smart container according to claim 36, wherein the weapons of mass destruction (WMD) detection feature includes,
a nuclear material sensing feature;
a biological material sensing feature; and
a chemical sensing feature.

38. A smart container configured to transport cargo on a transportation vehicle, the smart container comprising:
(a) a container housing having an opening capable of being sealed and unsealed;
(b) at least one container security detector disposed within the container housing, the at least one container security detector configured to detect security deviation information representative of unauthorized access into the container; and
(c) a communications link disposed within the container housing and in communication with the at least one container security detector, the communications link configured to receive container security deviation information from the at least one container security detector and to transmit container security deviation information indicative of the unauthorized access into the container to a remote cargo data collection location;
(d) wherein the container security system includes:
a door open/close detection device;
a GPS based route verification feature;
a intrusion detection device;
a motion detection device;
a volumetric change detection device; and
a weapons of mass destruction (WMD) detection feature.

39. The smart container according to claim 38, wherein the weapons of mass destruction (WMD) detection feature includes,
a nuclear material sensing feature;
a biological material sensing feature; and
a chemical sensing feature.

40. A smart container configured to transport cargo on a transportation vehicle, the smart container comprising:
(a) a container housing having an opening capable of being sealed and unsealed;
(b) at least one route deviation detector disposed within the container housing, the at least one route deviation detector configured to detect deviations from a planned route of the transportation vehicle; and
(c) a communications link disposed within the container housing and in communication with the at least one route deviation detector, the communications link configured to receive route deviation information from the at least one route deviation detector and to transmit the route deviation information from the container to a central cargo data collection location;
(d) wherein the container security system includes:
a door open/close detection device;
a GPS based route verification feature;
a intrusion detection device;
a motion detection device;
a volumetric change detection device; and
a weapons of mass destruction (WMD) detection feature.

41. The smart container according to claim 40, wherein the weapons of mass destruction (WMD) detection feature includes,
a nuclear material sensing feature;
a biological material sensing feature; and
a chemical sensing feature.

* * * * *